United States Patent
Lee

(10) Patent No.: US 7,914,417 B2
(45) Date of Patent: Mar. 29, 2011

(54) SHIFT CONTROL APPARATUS OF AUTOMATIC TRANSMISSION

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 636 days.

(21) Appl. No.: 11/957,645

(22) Filed: Dec. 17, 2007

(65) Prior Publication Data

US 2009/0118049 A1    May 7, 2009

(30) Foreign Application Priority Data

Nov. 2, 2007 (KR) .................. 10-2007-0111536

(51) Int. Cl.
*F16H 61/04* (2006.01)
*F16H 59/20* (2006.01)

(52) U.S. Cl. ........ 477/148; 477/133; 477/136; 477/144; 477/154

(58) Field of Classification Search .......... 477/133, 477/136, 143, 144, 148, 154
See application file for complete search history.

(56) References Cited

U.S. PATENT DOCUMENTS

| | | | | |
|---|---|---|---|---|
| 5,863,276 A | * | 1/1999 | Lee ............................... | 477/144 |
| 5,924,958 A | * | 7/1999 | Tsuchiya et al. .............. | 477/145 |
| 5,961,421 A | * | 10/1999 | Hoshiya et al. ............... | 477/140 |
| 6,024,672 A | * | 2/2000 | Chung .......................... | 477/140 |
| 6,616,560 B2 | * | 9/2003 | Hayabuchi et al. ........... | 475/116 |
| 6,626,786 B2 | * | 9/2003 | Hayabuchi et al. ........... | 475/127 |
| 6,761,664 B2 | * | 7/2004 | Ayabe et al. ................... | 477/144 |
| 2004/0043857 A1 | * | 3/2004 | Nishida et al. ................. | 475/125 |
| 2008/0139364 A1 | * | 6/2008 | Lee ............................... | 477/143 |

FOREIGN PATENT DOCUMENTS

KR    1020030010543 A    2/2003

* cited by examiner

*Primary Examiner* — Roger Pang
(74) *Attorney, Agent, or Firm* — Morgan, Lewis & Bockius LLP

(57) ABSTRACT

A shift control method and apparatus of an automatic transmission for controlling a shift from one speed, achieved by engagement of a first and a second frictional element, to another speed, achieved by engagement of a third and a fourth frictional element. The method includes detecting a rotation speed of a turbine, detecting a rotation speed of at least one operating member of at least one planetary gear set of the automatic transmission, and controlling the shift according to the rotation speeds of the turbine and the operating member. The control includes overlapping a first shift, from the one speed to an additional speed, with a second shift, from the additional speed to the other speed. The additional speed has a gear ratio that is near a gear ratio of the one speed.

5 Claims, 4 Drawing Sheets

| speed | C1 | C2 | C3 | C4 | B1 | B2 | F1 |
|---|---|---|---|---|---|---|---|
| 1 | ● |  |  |  | ○ |  | ● |
| 2 | ● |  |  |  |  | ● |  |
| 3 | ● |  |  | ● |  |  |  |
| 4 | ● |  | ● |  |  |  |  |
| 5 |  |  | ● | ● |  |  |  |
| 6 |  | ● | ● |  |  |  |  |
| 7 |  |  | ● |  |  | ● |  |
| 8 |  |  | ● |  | ● |  |  |
| Rev. |  |  |  | ● | ● |  |  |

SHIFT CONTROL APPARATUS OF AUTOMATIC TRANSMISSION

CROSS-REFERENCE TO RELATED APPLICATION

This application claims priority to, and the benefit of, Korean Patent Application No. 10-2007-0111536, filed in the Korean Intellectual Property Office on Nov. 2, 2007, the entire contents of which are incorporated herein by reference.

BACKGROUND OF THE INVENTION (a) Field of the Invention

The present invention relates to a shift control method and apparatus of an automatic transmission that control a shift from one speed, achieved by engagement of first and second frictional elements, to another speed, achieved by engagement of third and fourth frictional elements.

(b) Description of the Related Art

Generally, one frictional element is released and another frictional element is engaged during a clutch-to-clutch shift control. However, during some specific skip-shifting processes, two frictional elements may be released and two other frictional elements may be engaged.

Particularly, in the case of a kick-down 8 to 2 skip shift where six speed steps are shifted, generally two frictional elements must be released and two other frictional elements must be engaged. Controlling this shift is difficult.

Therefore, two successive shifting processes are sometimes used. For example, a 7 to 2 shift is performed after an 8 to 7 shift is completed so as to perform an 8 to 2 shift. However, this takes additional time, and deteriorates shift feel.

Another proposed solution is to overlap the two shifting processes However, torque of the middle speed may be generated and a double shift feel may be felt.

In addition, since the shift is controlled according only to rotation speed of a turbine, the shift may not be precisely controlled.

The above information disclosed in this Background section is only for enhancement of understanding of the background of the invention and therefore it may contain information that does not form the prior art that is already known in this country to a person of ordinary skill in the art.

SUMMARY OF THE INVENTION

A shift control method and apparatus of an automatic transmission for controlling a shift from one speed, achieved by engagement of a first and a second frictional element, to another speed, achieved by engagement of a third and a fourth frictional element. The method includes detecting a rotation speed of a turbine, detecting a rotation speed of at least one operating member of at least one planetary gear set of the automatic transmission, and controlling the shift according to the rotation speeds of the turbine and the operating member. The control includes overlapping a first shift, from the one speed to an additional speed, with a second shift, from the additional speed to the other speed. The additional speed has a gear ratio that is near a gear ratio of the one speed.

The first shift may include releasing the first frictional element and engaging the third frictional element. The second shift may include releasing the second frictional element and engaging the third frictional element.

The release of the first frictional element and the engagement of the third frictional element may be controlled according to the rotation speed of the operating member. The release of the second frictional element and the engagement of the fourth frictional element may be controlled according to the rotation speed of the turbine.

The method may also control the rotation speed of the turbine such that a current gear ratio is the same as the gear ratio of the additional speed at a shift synchronizing point, at which the rotation speed of the operating member is a target speed.

The release control of the first frictional element and the engagement control of the third frictional element may begin simultaneously.

The release control of the second frictional element may begin when a first predetermined time has passed since the release control of the first frictional element began. The engagement control of the fourth frictional element may begin when a second predetermined time has passed since the release control of the second frictional element began.

Actually releasing the first frictional element may begin when the rotation speed of the operating member is a first predetermined value. Actually engaging the third frictional element may begin when the rotation speed of the operating member is a second predetermined value.

The release of the first frictional element may be completed by reducing hydraulic pressure of the first frictional element at the shift synchronizing point.

Release of the second frictional element may begin at the shift synchronizing point. Engagement of the fourth frictional element may begin when the rotation speed of the turbine is a first predetermined turbine speed.

The release of the second frictional element may be completed when the rotation speed of the turbine is a second predetermined turbine speed. The engagement of the fourth frictional element may be completed when the rotation speed of the turbine is a third predetermined turbine speed.

DETAILED DESCRIPTION OF PREFERRED EMBODIMENTS

An exemplary embodiment of the present invention will hereinafter be described in detail with reference to the accompanying drawings.

Figures 1, 2:
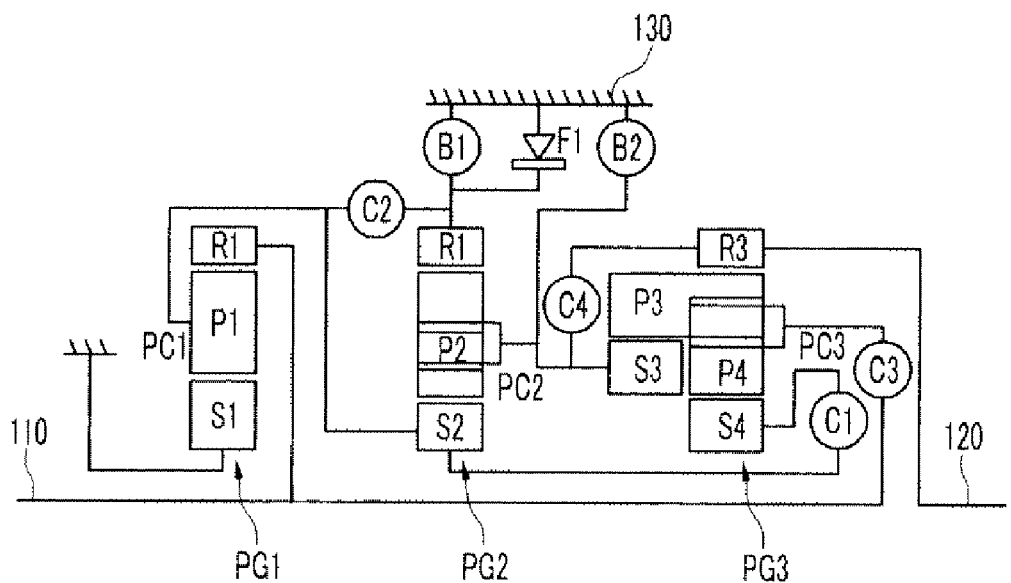
FIG. 1 is a schematic diagram of a power train of an automatic transmission according to an exemplary embodiment of the present invention.
FIG. 2 is an operational chart of a power train of an automatic transmission according to an exemplary embodiment of the present invention.

As shown in FIG. 1, a power train of an automatic transmission includes first, second, and third planetary gear sets PG1, PG2, and PG3.

The first planetary gear set PG1 is a single pinion planetary gear set, and includes a first sun gear S1, a first planet carrier PC1, and a first ring gear R1 as operating members thereof. A first pinion gear P1 is engaged with the first ring gear R1 and the first sun gear S1.

The second planetary gear set PG2 is a double pinion planetary gear set and has a second sun gear S2, a second planet carrier PC2, and a second ring gear R2 as operating members thereof. A second pinion gear P2 is engaged with the second ring gear R2 and the second sun gear S2.

The third planetary gear set PG3 is a Ravigneaux planetary gear set and has a third sun gear S3, a fourth sun gear S4, a third planet carrier PC3, and a third ring gear R3 as operating members thereof. A third pinion gear P3 is engaged with the third ring gear R3 and the third sun gear S3, and a fourth pinion gear P4 is engaged with the third ring gear R3 and the fourth sun gear S4.

In addition, the power train of an automatic transmission includes an input shaft 110 for receiving torque from an engine (not shown), an output gear 120 for outputting torque from the power train, and a transmission case 130.

The first ring gear R1 is fixedly connected to the input shaft 110 and always operates as an input member. The first sun gear S1 is fixedly connected to the transmission case 130. The first planet carrier PC1 is fixedly connected to the second sun gear S2.

The fixedly connected first planet carrier PC1 and the second sun gear S2 are selectively connected to the fourth sun gear S4 by operation of a first clutch C1 and are selectively connected to the second ring gear R2 by operation of a second clutch C2.

The second ring gear R2 is selectively connected to the transmission case 130 by operation of a first brake B1. A one-way clutch F1 is disposed in parallel with the first brake B1, between the second ring gear R2 and the transmission case 130.

The third planet carrier PC3 is selectively connected to the input shaft 110 by operation of a third clutch C3.

The second planet carrier PC2 is fixedly connected to the third sun gear S3.

The fixedly connected second planet carrier PC2 and third sun gear S3 are selectively connected to the third ring gear R3 by operation of a fourth clutch C4 and selectively connected to the transmission case 130 by operation of a second brake B2.

The third ring gear R3 is fixedly connected to the output gear 120 and always operates as an output member.

As shown in FIG. 2, the first clutch C1 and the one-way clutch F1 are operated in a first forward speed D1, the first clutch C1 and the second brake B2 are operated in a second forward speed D2, the first and fourth clutches C1 and C4 are operated in a third forward speed D3, the first and third clutches C1 and C3 are operated in a fourth forward speed D4, the third and fourth clutches C3 and C4 are operated in a fifth forward speed D5, the second and third clutches C2 and C3 are operated in a sixth forward speed D6, the third clutch C3 and the second brake B2 are operated in a seventh forward speed D7, the third clutch C3 and the first brake B1 are operated in an eighth forward speed D8, and the fourth clutch C4 and the first brake B1 are operated in a reverse speed REV.

Figure 3:
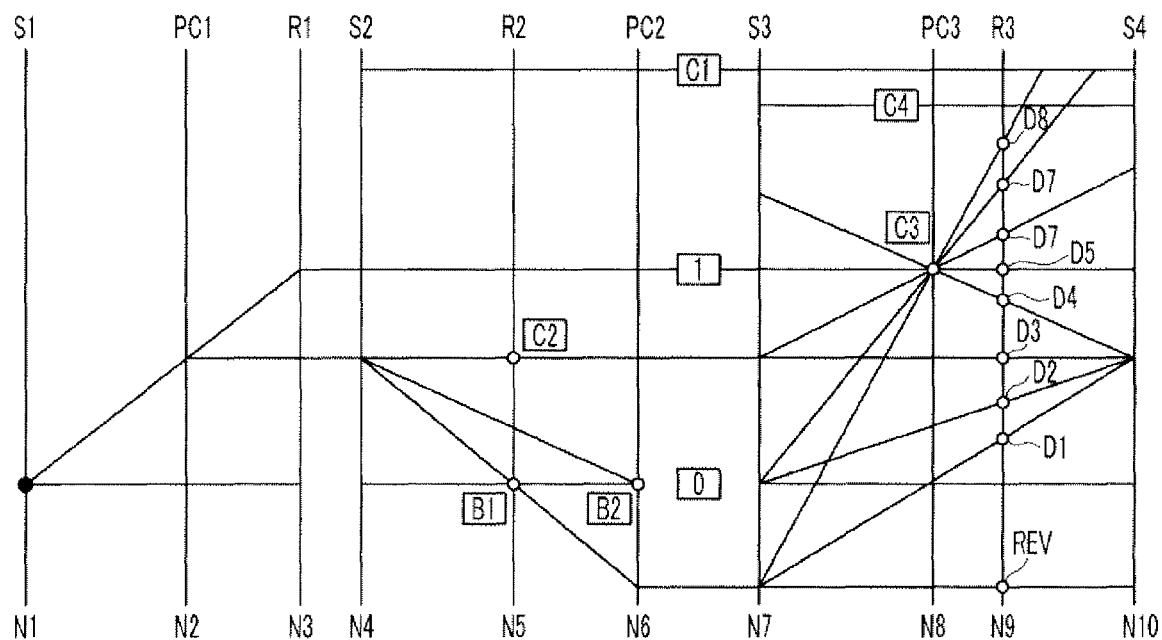
FIG. 3 is a lever diagram showing shifting processes according to an exemplary embodiment of the present invention.

As shown in FIG. 3, the first sun gear S1 is set as a first node N1, the first planet carrier PC1 is set as a second node N2, the first ring gear R1 is set as a third node N3, the second sun gear S2 is set as a fourth node N4, the second ring gear R2 is set as a fifth node N5, the second planet carrier PC2 is set as a sixth node N6, the third sun gear S3 is set as a seventh node N7, the third planet carrier PC3 is set as an eighth node N8, the third ring gear R3 is set as a ninth node N9, and the fourth sun gear S4 is set as a tenth node N10.

The first node N1 is fixedly connected to the transmission case 130 and is always stopped, and the third node N3 is fixedly connected to the input shaft 110 and always rotates with the same rotation speed as the input shaft 110. Therefore, the second node N2 rotates with reduced rotation speed that is slower than the rotation speed of the input shaft 110, and the reduced rotation speed is transmitted to the fourth node N4 fixedly connected to the second node N2.

In the first forward speed D1, the fourth node N10 rotates with the reduced rotation speed by operation of the first clutch C1, and the fifth node N5 is stopped by operation of the one-way clutch F1. In addition, a reverse rotation speed is generated at the sixth node N6 by the fourth node N4 that rotates with the reduced rotation speed and the fifth node N5 that is stopped, and the reverse rotation speed is transmitted to the seventh node N7 fixedly connected to the sixth node N6. Therefore, the first forward speed D1 is generated at the ninth node N9.

In the second forward speed D2, the fourth node N10 rotates with the reduced rotation speed by operation of the first clutch C1, and the sixth node N6 and the seventh node N7 fixedly connected thereto are stopped by operation of the second brake B2. Therefore, the second forward speed D2 is generated at the ninth node N9.

In the third forward speed D3, the fourth node N10 rotates with the reduced rotation speed by operation of the first clutch C1, and all operating members of the third planetary gear set PG3 rotate with the reduced rotation speed by operation of the fourth clutch C4. Therefore, the third forward speed D3 is generated at the ninth node N9.

In the fourth forward speed D4, the fourth node N10 rotates with the reduced rotation speed by operation of the first clutch C1, and the eighth node N8 rotates with the same rotation speed as the input shaft 110 by operation of the third clutch C3. Therefore, the fourth forward speed D4 is generated at the ninth node N9.

In the fifth forward speed D5, the eighth node N8 rotates with the same rotation speed as the input shaft 110 by operation of the third clutch C3, and all operating members of the third planetary gear set PG3 rotate with the same rotation speed as the eighth node N8 by operation of the fourth clutch C4. Therefore, the fifth forward speed D5 is generated at the ninth node N9.

In the sixth forward speed D6, the eighth node N8 rotates with the same rotation speed as the input shaft 110 by operation of the third clutch C3, and the fifth node N5 rotates with the reduced rotation speed by operation of the second clutch C2. In addition, since the fourth node N4 and the fifth node N5 rotate with the reduced rotation speed, the sixth node N6 also rotates with the reduced rotation speed and the reduced rotation speed is transmitted to the seventh node N7. Therefore, the sixth forward speed D6 is generated at the ninth node N9.

In the seventh forward speed D7, the eighth node N8 rotates with the same rotation speed as the input shaft 110 by operation of the third clutch C3, and the seventh node N7 is stopped by operation of the second brake B2. Therefore, the seventh forward speed D7 is generated at the ninth node N9.

In the eighth forward speed D8, the eighth node N8 rotates with the same rotation speed as the input shaft 110 by operation of the third clutch C3, and the fifth node N5 is stopped by operation of the first brake B1. In addition, the reverse rotation speed is generated at the sixth node N6 by the fourth node N4 that rotates with the reduced rotation speed and the fifth node N5 that is stopped, and the reverse rotation speed is transmitted to the seventh node N7 fixedly connected to the sixth node N6. Therefore, the eighth forward speed D8 is generated at the ninth node N9.

In the reverse speed REV, all operating members of the third planetary gear set PG3 rotate with the same rotation speed by operation of the fourth clutch C4, and the fifth node N5 is stopped by operation of the first brake B1. In addition, the reverse rotation speed is generated at the sixth node N6 by the fourth node N4 that rotates with the reduced rotation speed and the fifth node N5 that is stopped, and the reverse rotation speed is transmitted to the seventh node N7 fixedly connected to the sixth node N6. Therefore, the reverse speed REV is generated at the ninth node N9.

Figure 4:
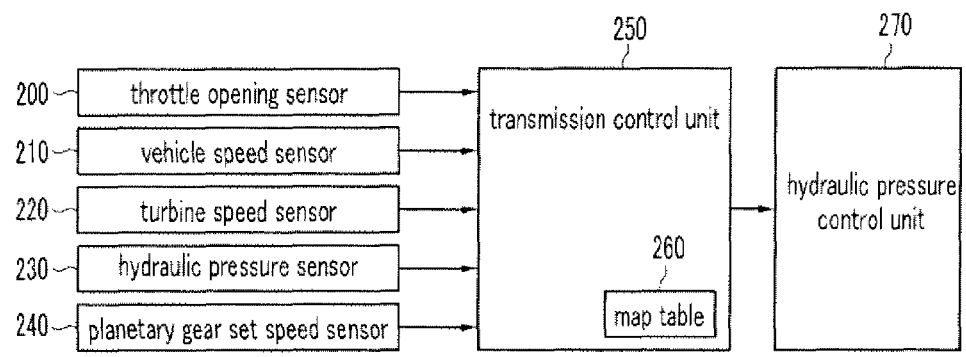
FIG. 4 is a block diagram of a shift control apparatus of an automatic transmission according to an exemplary embodiment of the present invention.

As shown in FIG. 4, a shift control apparatus of an automatic transmission according to an exemplary embodiment of the present invention includes a throttle opening sensor 200, a vehicle speed sensor 210, a turbine speed sensor 220, a hydraulic pressure sensor 230, a planetary gear set speed sensor 240, a transmission control unit 250, and a hydraulic pressure control unit 270.

The throttle opening sensor 200 detects opening of a throttle valve that operates based on the amount of depression of the accelerator pedal. The vehicle speed sensor 210 detects vehicle speed. The turbine speed sensor 220 detects rotation speed of a turbine that operates as input torque of the transmission, based on a phase angle of a crank shaft. The hydraulic pressure sensor 230 detects hydraulic pressures applied to the off-going and on-coming elements. Each sensor transmits a signal indicative of its measurement to the transmission control unit 250.

The planetary gear set speed sensor 240 is mounted at one operating member of the planetary gear sets PG1, PG2, and PG3 and detects rotation speed thereof. In addition, the planetary gear set speed sensor 240 transmits a signal corresponding thereto to the transmission control unit 250. In this case, the transmission control unit 250 may calculate rotation speed of all operating members of the planetary gear sets PG1, PG2, and PG3 based on the rotation speed of one operating member.

The transmission control unit 250 may include one or more processors programmed to perform the inventive method. The transmission control unit 250 may also include a memory and associated hardware, software, and/or firmware as may be selected and programmed by a person of ordinary skill in the art based on the teachings herein.

The transmission control unit 250 receives the signals from the throttle opening sensor 200, the vehicle speed sensor 210, the turbine speed sensor 220, the hydraulic pressure sensor 230, and the planetary gear set speed sensor 240. The transmission control unit 250 generates a hydraulic pressure shift signal corresponding to the signals and transmits the hydraulic pressure shift signal to the hydraulic pressure control unit 270.

The throttle opening in accordance with the vehicle speed at each speed is stored in a map table 260 of the transmission control unit 250. Therefore, the transmission control unit 250 calculates a target speed in accordance with the throttle opening signal and the vehicle speed signal, and determines whether a shifting condition is satisfied.

In addition, hydraulic pressures applied to the frictional elements according to the rotation speed of the turbine and the operating member are stored in the map table 260.

The throttle opening, engaging and releasing pressures, and rotation speed of the turbine and the operating member stored in the map table 260 may be selected by a person of ordinary skill in the art based on the teachings herein according to vehicle and engine type.

The hydraulic pressure control unit 270 receives the hydraulic pressure shift signal from the transmission control unit 250 and controls hydraulic pressures applied to the off-going and on-coming elements. The hydraulic pressure control unit 270 includes at least one of control valves and solenoid valves that control the hydraulic pressure of the off-going and on-coming elements.

Figure 5:
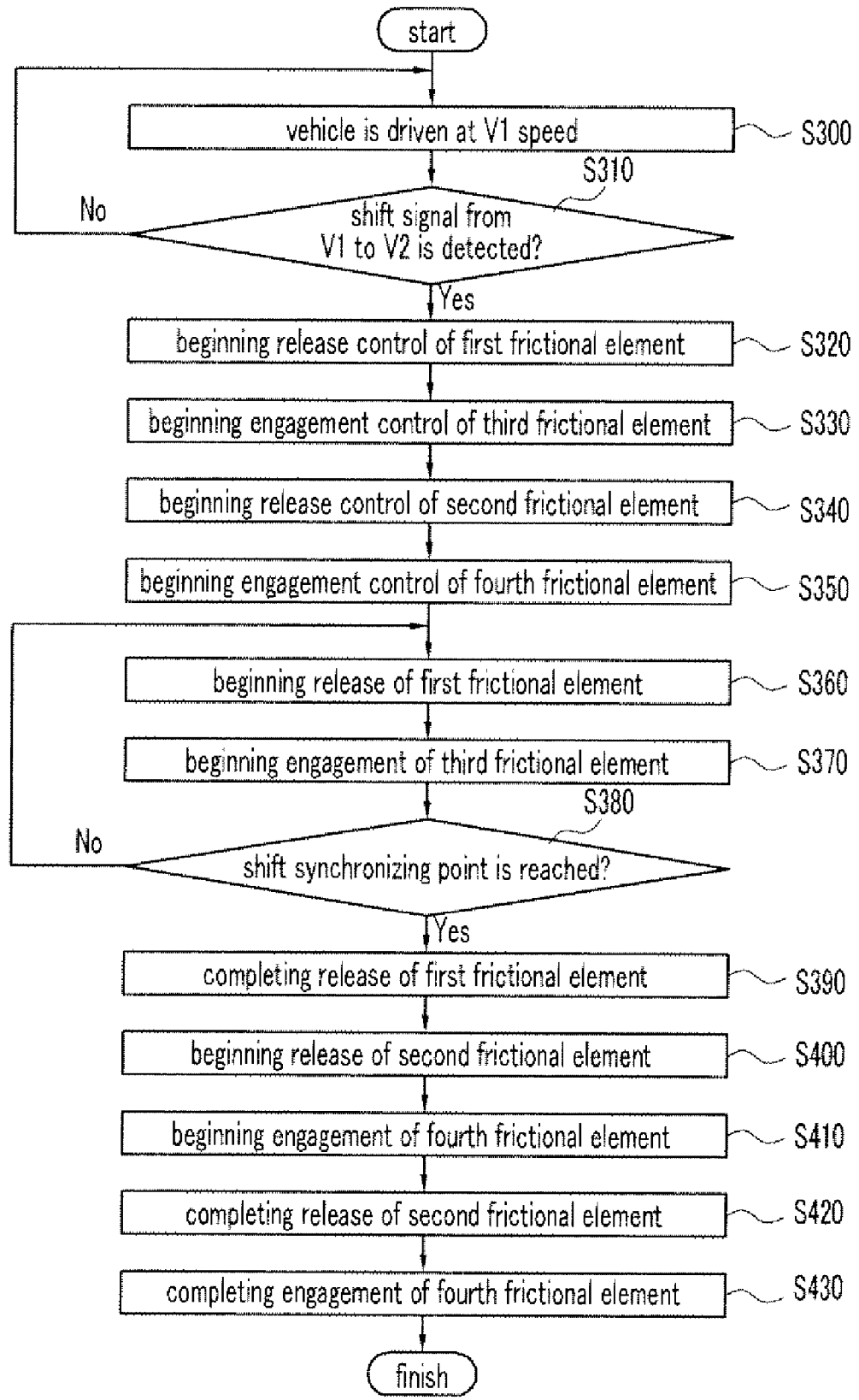
FIG. 5 is a flowchart showing a shift control method according to an exemplary embodiment of the present invention.

Referring to FIG. 5, a shift control method of an automatic transmission according to an exemplary embodiment of the present invention is utilized to shift between one speed V1, achieved by engagement of first and second friction elements, and another speed V2, achieved by engagement of third and fourth friction elements. As shown in FIG. 5, when the vehicle is driven at speed V1 at step S300, the transmission control unit 250 determines whether a shift signal from speed V1 to speed V2 is detected at step S310. The shift signal from speed V1 to speed V2 is generated when the throttle opening in accordance with the vehicle speed is larger than or equal to a predetermined throttle opening.

If the transmission control unit 250 does not detect the shift signal from speed V1 to speed V2, the vehicle continues to be driven at speed V1 at step S300. If the transmission control unit 250 detects the shift signal from speed V1 to speed V2, the transmission control unit 250 begins release control of the first frictional element at step S320 and begins engagement control of the third frictional element at step S330. The release control of the first frictional element and the engagement control of the third frictional element may begin simultaneously.

Here, the beginning of the release and engagement controls means that hydraulic pressure of each friction element is started to be controlled. That is, the beginning of the release control means that hydraulic pressure of an off-going element is increased to a specific value after being reduced by a constant slope, and the beginning of the engagement control means that hydraulic pressure of an on-coming element is maintained as stand-by pressure after being increased to a pre-charge pressure. The specific value, the pre-charge pressure, and the stand-by pressure can be selected by a person of ordinary skill in the art based on the teachings herein, and may be stored in the map table 260.

After that, the transmission control unit 250 begins release control of the second frictional element at step S340 and begins engagement control of the fourth frictional element at step S350.

Then, the transmission control unit 250 begins release of the first frictional element at step S360 and begins engagement of the third frictional element at step S370.

Here, the beginning of the engagement of the frictional element means that the frictional element is actually engaged. That is, hydraulic pressure of the frictional element, which is maintained as the stand-by pressure, is started to be increased to on-coming pressure. In addition, the beginning of the release of the frictional element means that hydraulic pressure of the frictional element is quickly reduced to zero after being maintained at the specific value.

Figure 6:
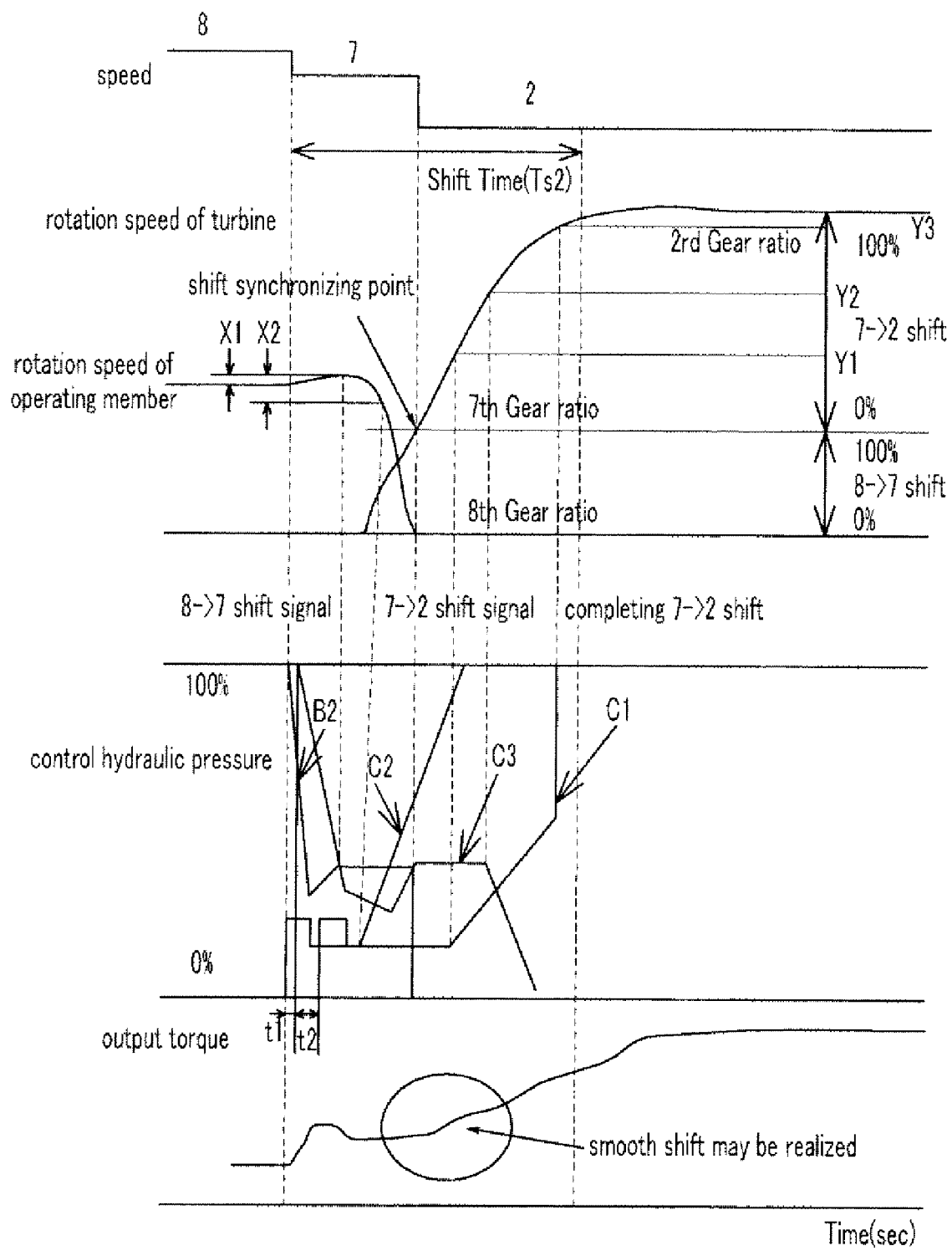
FIG. 6 a graph showing rotation speed of a turbine and an operating member, a control hydraulic pressure, and an output torque of an exemplary shift control apparatus of an automatic transmission according to an embodiment of the present invention.

After that, the transmission control unit 250 determines whether a shift synchronizing point is reached at step S380. As shown in FIG. 6, the shift synchronizing point may be reached when the rotation speed of the operating member is the same as the target speed. The target speed may be predetermined according to a shift speed by a person skilled in the art and be stored in the map table 260.

If the transmission control unit 250 determines that the shift synchronizing point is not reached at the step S380, the transmission control unit 250 continues to perform the release of the first frictional element and the engagement of the third frictional element. If the transmission control unit 250 determines that the shift synchronizing point is reached at the step S380, the transmission control unit 250 completes the release of the first frictional element by quickly reducing the hydraulic pressure of the first frictional element to zero at step S390.

After that, the transmission control unit 250 begins release of the second frictional element at step S400 and begins engagement of the fourth frictional element at step S410.

Then, the transmission control unit 250 completes the release of the second frictional element by reducing the hydraulic pressure of the second frictional element to zero by a constant slope at step S420 and competes the engagement of the fourth frictional element by quickly increasing the hydraulic pressure of the fourth frictional element to on-coming pressure at step S430.

Referring to FIG. 6, for ease of description, an 8 to 2 shift will be described. However, the present invention is not limited to an 8 to 2 shift but is applicable to all skip shifts where four frictional elements are controlled.

As shown in FIG. 6, if the transmission control unit 250 detects an 8-2 shift signal in a state in which a vehicle is driven at 8th speed, the transmission control unit 250 determines a speed V3, a gear ratio of which is closest to the gear ratio of the 8th speed, and the first, second, third, and fourth frictional elements. According to an exemplary embodiment of the present invention, speed V3 is 7th speed, and the first, second, third, and fourth frictional elements are shown in Table 1.

TABLE 1

| First frictional element | Second frictional element | Third frictional element | Fourth frictional element |
|---|---|---|---|
| First brake B1 | Third clutch C3 | Second brake B2 | First clutch C1 |

The shift control method according to an exemplary embodiment of the present invention overlaps a first shift from speed V1 to speed V3 with a second shift from speed V3 to speed V2. The first frictional element is released and the third frictional element is engaged in the first shift, and the second frictional element is released and the fourth frictional element is engaged in the second shift. In addition, the release of the first frictional element and the engagement of the third frictional element are controlled according to the rotation speed of the operating member detected by the planetary gear set speed sensor 240, and the release of the second frictional element and the engagement of the fourth frictional element are controlled by the rotation speed of the turbine detected by the turbine speed sensor 220.

The transmission control unit 250 begins the release control of the first frictional element and begins the engagement control of the third frictional element. That is, the hydraulic pressure of the first frictional element is reduced by a constant slope and is increased, and the hydraulic pressure of the third frictional element is maintained to the stand-by pressure after being quickly increased to the pre-charge pressure. The release control of the first frictional element and the engagement control of the third frictional element may begin simultaneously.

Then, the transmission control unit 250 begins the release control of the second frictional element and begins the engagement control of the fourth frictional element. The release control of the second frictional element begins when a first predetermined time t1 has passed since the release control of the first frictional element began, and the engagement control of the fourth frictional element begins when a second predetermined time t2 has passed since the release control of the second frictional element began. Therefore, hydraulic pressure supplied to the frictional elements may be simply and precisely controlled, and the rotation speed of the turbine may not be quickly increased. The first and second predetermined times t1 and t2 can be selected by a person of ordinary skill in the art, and may be stored in the map table 260.

After that, the transmission control unit 250 begins the release of the first frictional element and the engagement of the third frictional element. That is, the hydraulic pressure of the first frictional element is maintained to a specific value and the hydraulic pressure of the third frictional element is increased by a constant slope. The release of the first frictional element begins when the rotation speed of the operating member detected by the planetary gear set speed sensor 240 is a first predetermined value X1, and the engagement of the third frictional element begins when the rotation speed of the operating member detected by the planetary gear set speed sensor 240 is a second predetermined value X2. The rotation speed of the turbine is controlled according to the rotation speed of the operating member measured by the planetary gear set speed sensor 240. That is, the rotation speed of the turbine is controlled such that current gear ratio is the same as the gear ratio of speed V3 at the shift synchronizing point where the rotation speed of the operating member measured by the planetary gear set speed sensor 240 is the target speed. The rotation speed of the operating members cut off from the turbine is detected and hydraulic pressure supplied to the frictional elements is controlled thereby. Therefore, the rotation speed of the turbine is prevented from being quickly increased and the shift is precisely controlled, minimizing shift shock. The first and second predetermined values X1 and X2 and the target speed can be selected by a person of ordinary skill in the art and may be stored in the map table 260.

While the release control of the first frictional element and the engagement control of the third frictional element are performed, the transmission control unit 250 determines whether the shift synchronizing point is reached. The shift synchronizing point may be reached when the rotation speed of the operating member detected by the planetary gear set speed sensor 240 is the target speed.

If the shift synchronizing point is reached, the transmission control unit 250 completes the release of the first frictional element by quickly reducing the hydraulic pressure of the first frictional element to zero, and begins the release of the second frictional element by maintaining the hydraulic pressure of the second frictional element to a specific value.

In addition, the transmission control unit 250 begins the engagement of the fourth frictional element when the rotation speed of the turbine is a first predetermined turbine speed Y1. That is, the hydraulic pressure of the fourth frictional element is increased by a constant slope.

After that, the transmission control unit 250 completes the release of the second frictional element by reducing the hydraulic pressure of the second frictional element by a constant slope when the rotation speed of the turbine is a second predetermined turbine speed Y2. In addition, the transmission control unit 250 completes the engagement of the fourth frictional element by quickly increasing the hydraulic pressure of the fourth frictional element to the on-coming pressure when the rotation speed of the turbine is a third predetermined turbine speed Y3.

The first, second, and third predetermined turbine speeds Y1, Y2, and Y3 can be selected by a person of ordinary skill in the art and may be stored in the map table 260.

According to an exemplary embodiment of the present invention, rotation speed of a turbine is not quickly increased as a consequence of the rotation speed of the turbine being controlled according to rotation speed of operating members of planetary gear sets.

In addition, the rotation speed of the operating members cut off from the turbine is precisely detected and thereby the shift process is controlled. Therefore, the shift is precisely controlled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission for controlling a shift from one speed, achieved by engagement of a first and a second frictional element, to another speed, achieved by engagement of a third and a fourth frictional element, comprising:
   detecting a rotation speed of a turbine;
   detecting a rotation speed of at least one operating member of at least one planetary gear set of the automatic transmission; and
   controlling the shift according to the rotation speeds of the turbine and the operating member;
   wherein the controlling comprises overlapping a first shift, from the one speed to an additional speed, with a second shift, from the additional speed to the other speed, wherein the additional speed comprises a gear ratio that is near a gear ratio of the one speed;
   wherein the first shift comprises releasing the first frictional element and engaging the third frictional element; and the second shift comprises releasing the second frictional element and engaging the fourth frictional element;
   wherein the release of the first frictional element and the engagement of the third frictional element are controlled according to the rotation speed of the operating member, and the release of the second frictional element and the engagement of the fourth frictional element are controlled according to the rotation speed of the turbine;
   wherein controlling the rotation speed of the turbine is performed such that a current gear ratio is the same as the gear ratio of the additional speed at a shift synchronizing point, at which the rotation speed of the operating member is a target speed;
   wherein the release control of the first frictional element and the engagement control of the third frictional element begin substantially simultaneously; and
   wherein the release control of the second frictional element begins when a first predetermined time has passed since the release control of the first frictional element began, and the engagement control of the fourth frictional element begins when a second predetermined time has passed since the release control of the second frictional element began.

2. The method of claim 1, wherein actually releasing the first frictional element begins when the rotation speed of the operating member is a first predetermined value, and actually engaging the third frictional element begins when the rotation speed of the operating member is a second predetermined value.

3. The method of claim 2, wherein the release of the first frictional element is completed by reducing hydraulic pressure of the first frictional element at the shift synchronizing point.

4. The method of claim 1, wherein release of the second frictional element begins at the shift synchronizing point, and engagement of the fourth frictional element begins when the rotation speed of the turbine is a first predetermined turbine speed.

5. The method of claim 4, wherein the release of the second frictional element is completed when the rotation speed of the turbine is a second predetermined turbine speed, and the engagement of the fourth frictional element is completed when the rotation speed of the turbine is a third predetermined turbine speed.

* * * * *